Patented Feb. 7, 1939

2,146,324

UNITED STATES PATENT OFFICE 2,146,324

HEXA ALKYLENE GLYCOL DIALKYL ETHERS AND PROCESS OF MAKING THEM

Glenn F. Zellhoefer, Bloomington, and Carl S. Marvel, Urbana, Ill.; said Marvel assignor to said Zellhoefer No Drawing. Application November 17, 1937, Serial No. 175,085

13 Claims. (Cl. 260—615)

The present invention relates to certain new organic compounds useful for various industrial purposes, for example, as solvents, plasticizers, and the like. It also relates to a method of manufacturing such compounds.

Broadly stated, the object of the present invention is to provide a new group or series of organic compounds suitable for use as solvents.

More particularly, the object is to prepare certain new and useful organic compounds which contain, within their structure, what may be termed a plurality of "active solvent groups."

A further object is to provide a series of new organic compounds which may be designated "polyethers"; that is to say, compounds which contain a plurality of ether linkages within the molecule.

Another object is to prepare certain new ethers of the polyalkylene glycols, and to provide a suitable method for the manufacture thereof.

Other objects will be apparent as the invention is hereinafter more fully described.

The foregoing and other objects may be accomplished in accordance with the present invention, one aspect of which comprises the dialkyl ethers of the hexa alkylene glycols, which may be represented by the following general formula:

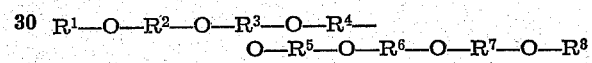

where $R^1$ and $R^8$ are alkyl groups, either the same or different; and $R^2$, $R^3$, $R^4$, $R^5$, $R^6$, and $R^7$ are alkylene groups, either the same or different.

As illustrative of the type of compound contemplated by the present invention, mention may be made of the hexa alkylene glycol dialkyl ethers wherein the alkyl groups are derivable from the lower members of the aliphatic series, for example, the dimethyl-, the diethyl-, and the monomethyl-monoethyl-ethers of the hexa alkylene glycols.

For the purpose of illustrating the present invention still more fully, the hexa ethylene glycol dialkyl ethers will be selected as of particular interest, for the reason that the raw materials required for their manufacture are readily available in commercial quantities at the present time. It is to be clearly understood, however, that the invention is not restricted to these particular embodiments which are merely illustrative of the type of polyethers contemplated by the present invention, and are not to be considered restrictive of the scope thereof.

The polyethers of the present invention may be prepared by converting a monoalkyl ether of a polyalkylene glycol to the alkali metal derivative, by treatment with an alkali metal, for example. The alkali metal derivative is thereafter reacted with a β-, β-dihalo dialkyl ether. For example, the reactions involved in the preferred method of synthesizing the polyethers of the present invention, may be represented by the following equations:

1. $R^1\!-\!O\!-\!R^2\!-\!O\!-\!R^3\!-\!OH + M =$
   $R^1\!-\!O\!-\!R^2\!-\!O\!-\!R^3\!-\!OM + \tfrac{1}{2}H_2$ 2. 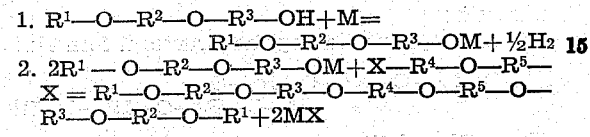

In order more clearly to disclose the nature of the present invention, a preferred embodiment thereof will now be described in considerable detail. It is to be clearly understood, however, that this is done merely by way of example, and solely for the purpose of illustrating, by means of a specific example, the basic principles which are broadly applicable to all the compounds contemplated by the present invention. In other words, the invention is not restricted to the specific example hereinafter more particularly described.

Example

The dimethyl ether of hexa ethylene glycol constitutes a preferred embodiment of the present invention. This compound was prepared in the following manner:

In a one-liter, three-necked, round-bottomed flask equipped with a dropping funnel, reflux condenser and stirrer were placed 375 g. (3.1 mols) of redistilled diethylene glycol mono ethyl ether ("methyl Carbitol") and 200 cc. of dry xylene. After 46 g. (2 mols) of sodium had completely reacted 143 g. (1 mol.) of β-, β-dichloro diethyl ether ("Chlorex") (B. P. 173°–175°), was slowly added through the dropping funnel. After the vigorous reaction had subsided the flask was warmed at 120°–130° for four hours in an oil bath. After standing overnight, the precipitated sodium chloride was filtered, the precipitate washed with ether, and the filtrate distilled in vacuum. The yield of product was 56 g., B. P. 195°–199° at 14 mm., or 18 per cent of the theoretical amount.

*Anal.*—Calcd. for $C_{14}H_{30}O_7$: C, 54.19; H, 9.68. Found: C, 53.20; H, 9.82.

In the foregoing detailed description of the preferred embodiment of the present invention, it will be readily apparent to anyone skilled in the art that many variations may be made without departing from the spirit and scope thereof. Thus the homologues of hexa ethylene glycol dimethyl ether, such as the corresponding diethyl- or monomethyl-mono-ethyl-ethers, may be prepared in a manner similar to that described above, by selecting the alkali metal derivative of the proper dialkylene glycol monoalkyl ether, and by using various dihalogen substituted ethers in place of $\beta$-$\beta$-dichloro diethyl ether. Furthermore, any agent other than the alkali metals may be employed if desired, to produce the alkali metal derivatives. The various conditions as to temperature, time, rate of addition of reactants and the like may be varied within certain limits, and the operator will have no difficulty in determining the optimum conditions for the manufacture of any particular compound contemplated by the present invention. Many other variations in detail will be readily apparent to anyone skilled in the art. The present invention is therefore to be restricted only in accordance with the following patent claims.

We claim:

1. A hexa alkylene glycol dimethyl ether.
2. A hexa alkylene glycol diethyl ether.
3. Hexa ethylene glycol dimethyl ether.
4. Hexa ethylene glycol diethyl ether.
5. Hexa ethylene glycol mono methyl mono ethyl ether.
6. A compound having the structural formula:

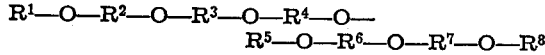

where $R^1$ and $R^8$ are normal alkyl groups; and $R^2$, $R^3$, $R^4$, $R^5$, $R^6$, and $R^7$ are alkylene groups.

7. A compound having the structural formula:

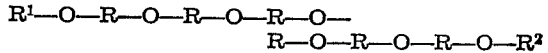

where $R^1$ and $R^2$ are normal lower alkyl groups; and R is an ethylene group.

8. The process of preparing hexa alkylene glycol dialkyl ethers, which comprises reacting an alkali metal derivative of a dialkylene glycol mono alkyl ether with a $\beta$-, $\beta$-dihalo-dialkyl ether.

9. The process of preparing a hexa alkylene glycol dialkyl ether which comprises converting a dialkylene glycol mono-alkyl ether to the alkali metal derivative thereof, and heating said alkali metal derivative with $\beta$-, $\beta'$-dihalo dialkyl ether.

10. The process of preparing hexa ethylene glycol dialkyl ethers which comprises converting diethylene glycol monoalkyl ether to the corresponding alkali metal derivative, heating said alkali metal derivative with $\beta$-, $\beta'$-dihalo diethyl ether, and separating the hexa ethylene glycol dialkyl ether from the reaction mixture.

11. The process of claim 10 wherein said monoalkyl ether is selected from the group consisting of the mono methyl and mono ethyl-ethers of diethylene glycol.

12. The process of preparing a polyether which comprises converting a polyalkylene glycol mono alkyl ether to the corresponding alkali metal derivative, heating said alkali metal derivative with a $\beta$-, $\beta'$-dihalo dialkyl ether, and separating the polyether from the reaction mixture.

13. The process of producing a polyether which comprises converting a polyethylene glycol mono alkyl ether to the corresponding alkali metal derivative, heating said alkali metal derivative with a $\beta$-, $\beta'$-dihalo diethyl ether, and separating the polyether from the reaction mixture.

GLENN F. ZELLHOEFER.
CARL S. MARVEL.